(12) United States Patent
Prasser et al.

(10) Patent No.: US 9,182,131 B1
(45) Date of Patent: Nov. 10, 2015

(54) SYSTEMS AND METHODS FOR HEAT RECOVERY

(71) Applicant: Thermo Recovery Filters, Inc., Avon, CO (US)

(72) Inventors: Robert H. Prasser, Lakewood, WI (US); Terry L. McCabe, Jr., Wausau, WI (US); Gregory R. Downey, Medford, WI (US); Michael L. Watz, Jr., Wausau, WI (US)

(73) Assignee: AQUA FILTERS, LLC, Avon, CO (US)

( * ) Notice: Subject to any disclaimer, the term of this patent is extended or adjusted under 35 U.S.C. 154(b) by 53 days.

(21) Appl. No.: 14/280,100

(22) Filed: May 16, 2014

Related U.S. Application Data

(63) Continuation-in-part of application No. 12/807,653, filed on Sep. 10, 2010, now Pat. No. 8,728,189.

(51) Int. Cl.
*B01D 50/00* (2006.01)
*B01D 45/08* (2006.01)
*F24C 15/20* (2006.01)
*F28F 1/12* (2006.01)
*B01D 45/16* (2006.01)

(52) U.S. Cl.
CPC ............ *F24C 15/2035* (2013.01); *B01D 45/08* (2013.01); *B01D 45/16* (2013.01); *B01D 50/00* (2013.01); *F28F 1/12* (2013.01); *Y10S 55/36* (2013.01)

(58) Field of Classification Search
CPC ........ B01D 50/00; B01D 45/12; B01D 45/16; B01D 45/08

USPC ........... 55/434.2, 440, 444, DIG. 36; 165/158
See application file for complete search history.

(56) References Cited

U.S. PATENT DOCUMENTS

| 3,260,189 A | 7/1966 | Jensen |
| 3,698,378 A | 10/1972 | Rosenberg et al. |
| 3,827,343 A | 8/1974 | Darm |
| 3,945,812 A | 3/1976 | Doane |
| 4,050,368 A | 9/1977 | Eakes |

(Continued)

FOREIGN PATENT DOCUMENTS

| BE | 829965 | 10/1975 |
| BE | 899292 | 7/1984 |

(Continued)

OTHER PUBLICATIONS

1991 Sweet's Catalog Identifying a "Range Guard" Grease Filter.

(Continued)

*Primary Examiner* — Robert A Hopkins
(74) *Attorney, Agent, or Firm* — Sheridan Ross P.C.

(57) ABSTRACT

A filter unit heat exchanger is provided that may include a housing substantially surrounding a heat exchange assembly. Provided through the housing are one or more tortuous fluid flow paths used to direct airflow therethrough around portions of the heat exchange assembly for efficient operation. The tortuous path(s) may be provided by one or more nozzle openings on an input side of the housing and one or more diffuser openings on an output side of the housing, where the nozzle openings and diffuser openings are offset to cause desired airflow deflection. The filter unit may include desired symmetries to improve manufacturability and/or installation.

19 Claims, 12 Drawing Sheets

(56) References Cited

U.S. PATENT DOCUMENTS

| | | |
|---|---|---|
| 4,084,745 A | 4/1978 | Jones |
| 4,122,834 A | 10/1978 | Jacobs |
| 4,175,614 A | 11/1979 | Huggins |
| 4,197,907 A | 4/1980 | Smith |
| 4,235,220 A | 11/1980 | Hepner |
| 4,350,504 A | 9/1982 | Diachuk |
| 4,437,867 A | 3/1984 | Lerner |
| 4,769,149 A | 9/1988 | Nobilet et al. |
| 5,456,244 A | 10/1995 | Prasser |
| 5,524,607 A | 6/1996 | Grohman et al. |
| 5,540,744 A | 7/1996 | Renna |
| 5,558,080 A | 9/1996 | Grohman et al. |
| 5,687,707 A | 11/1997 | Prasser |
| 6,344,074 B1 | 2/2002 | Ward et al. |
| 6,543,526 B2 | 4/2003 | Jacobs |
| 8,728,189 B2 | 5/2014 | Prasser |
| 2012/0060452 A1 | 3/2012 | Sikkenga et al. |
| 2012/0060820 A1 | 3/2012 | Sikkenga et al. |

FOREIGN PATENT DOCUMENTS

| | | |
|---|---|---|
| EP | 0021809 | 1/1981 |
| EP | 0036659 | 9/1981 |
| FR | 2443033 | 6/1980 |
| FR | 2482703 | 11/1981 |
| SU | 522377 | 9/1976 |

OTHER PUBLICATIONS

U.S. Pat. No. 5,687,707; Petition to Revive dated Oct. 24, 1996 (2 pages), Decision on Petition dated Nov. 19, 1996 (2 pages). First Preliminary Amendment dated Apr. 24, 1997 (1 page), Notice of Allowability dated Jun. 22, 1997 (3 pages), Notice of Allowability Issue fees due dated Jun. 25, 1997 (4 pages).

U.S. Pat. No. 5,456,244; Office Action dated Oct. 11, 1994 (5 pages), Reply and Amendment dated Feb. 10, 1995 (14 pages), Notice of Allowabiity dated Mar. 22, 1995 (4 pages), Submission of Formal Drawings dated Jun. 12, 1995 (4 pages). Report on the Filing or Determination of an Action Regarding a Patent dated Jul. 31, 1997 (4 pages).

International Search Report and Written Opinion dated Jan. 25, 2012 in International Patent Application Serial No. PCT/US11/50971.

Official Action for U.S. Appl. No. 12/807,653 mailed Sep. 17, 2013, 8 pages.

Official Action for U.S. Appl. No. 12/807,653 mailed Dec. 13, 2013, 9 pages.

Notice of Allowance for U.S. Appl. No. 12/807,653 mailed Jan. 6, 2014, 6 pages.

SYSTEMS AND METHODS FOR HEAT RECOVERY

The application is a continuation-in-part of U.S. patent application Ser. No. 12/807,653, filed Sep. 10, 2010, the entirety of which is incorporated by reference herein.

This application is also related to U.S. Pat. No. 5,456,244, titled "Combination Cook Stove Fluid Heater and Grease Filter," U.S. Pat. No. 5,687,707, titled "Combination Cook Stove Heat Exchanger and Filter," and U.S. Pat. No. 6,543,526, titled "Combination Cook Stove Heat Exchanger, Filter, and Recirculation Assembly," the entire disclosures of which are incorporated by reference herein.

FIELD OF THE INVENTION

Embodiments of the present invention generally relate to air filters and, more particularly, to an improved grease trap air filter that is also used as a heat transfer device.

BACKGROUND OF THE INVENTION

Commercial or institutional kitchens generally include cook stoves, hot plates, deep fat fryers, and other cooking devices that produce heat energy and particulates, i.e. grease. The extreme heat and particulates must be exhausted to atmosphere usually through flue chimneys or similar venting devices for the safety and comfort of the kitchen workers. This process replaces the hot kitchen air with cooler, clean outside air. Although this circulation process is necessary to provide a constant source of clean air to the kitchen environment, it is inefficient and uneconomical, especially in colder climates where the cost to heat internal air and water is significant.

Another problem encountered in commercial kitchens is that the generated particulates must be filtered. The particulates, that most commonly includes grease can eventually cause malfunction of air ventilation systems, which may create fire hazards. Accordingly, air filters located in flume hoods positioned over cooking surfaces must be cleaned often, which is time-consuming and expensive.

Venting and filtering systems may employ heat exchangers to capture thermal energy from the hot gases. For example, some systems employ a heat exchanger positioned downstream of a grease filter. This configuration is unfavorable for many reasons. First, these designs may be inefficient as the heat exchanger is usually located a significant distance from the heat source, which means heat is lost before the hot air encounters the heat exchanger. That is, the thermal energy is lost through heat dissipation before the heat exchanger is reached. Second, the existing grease filters significantly impede air flow, especially when congested with grease, which reduces the efficiency of the air ventilation system as heat is absorbed by the filter before the hot air reaches the heat exchanger. Third, when the heat source is turned off, the grease quickly solidifies within existing filters, which usually include fins that capture and maintains the particulate matter.

Many existing kitchens fail to incorporate any kind of heat exchanger because of integration costs. Retrofitting existing kitchen equipment with heat exchanger systems may require an entirely new flue hood assembly and substantial piping and accessories. Thus, conversion is time-consuming and expensive.

While some improvements have been made to combine a filter and heat exchanger, such as disclosed in U.S. Pat. No. 5,456,244, there remains a need to provide a filter system of simplified construction and that provides more efficient heat transfer than existing devices. To address this long-felt need, one embodiment of the present invention is a system for filtering and heat capture that is efficient and that may be retrofitted into existing flue systems.

SUMMARY OF THE INVENTION

It is one aspect of some embodiments of the present invention to provide a system that simultaneously filters grease and airborne particulate matter from hot gas flumes and transfers heat from the hot gas to a circulating fluid. The heated circulating fluid then transfers heat to a heat transfer medium, water, or air. The system of one embodiment can be retrofitted into existing flue hood ventilation systems of varying designs and dimensions.

Embodiments of the present invention include systems and methods related to filter units having simplified construction, using less material and providing more complete heat transfer than prior devices. More specifically, a filter unit according to one embodiment of the present invention comprises a housing generally comprised of a base and cover that surrounds a heat exchanger. The housing includes at least one entrance opening on an upstream side of the heat exchanger. The housing includes at least one baffle on a downstream side of heat exchanger opposite the upstream side. At least one exit opening is also provided through the housing on the downstream side of the heat exchanger. The at least one baffle may be aligned with the at least one entrance opening. In operation, hot gas is drawn through the at least one entrance opening and across the heat exchanger. The baffles will then redirect the gas towards the heat exchanger before the gas can leave the cavity through the at least one exit opening. In this way, hot air exposure to the heat exchanger is maximized.

It is another aspect of some embodiments of the present invention to provide a heat exchanger that increases heat transfer efficiency. More specifically, the heat exchanger may employ a heat-conductive material at least partially coated with a reduced friction material, such as polytetrafluoroethylene. The reduced-friction material enhances fluid flow, thereby increasing the rate at which the hot gases encounter heat transfer elements of the heat exchanger. The reduced-friction material also allows any captured particulates to drip from the heat transfer elements into a catch pan, instead of clinging to it.

Heat transfer is also increased by some embodiments of the present invention that employ an equal number of heat transfer fluid conduits, which may have equal surface area. Other embodiments of the present invention employ heat transfer fluid conduits that have heat exchange fins. The fins may surround one conduit or multiple conduits. The finned conduits are positioned in the fluid flow cavity provided by the housing, and increase thermal conductivity because the fins increase surface area of the heat exchanger fluid conduits. Other embodiments the present invention employ heat exchanger fluid conduits having dimples, turbulators, or other surface irregularities that help dissipate heat.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described below. Further, the Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
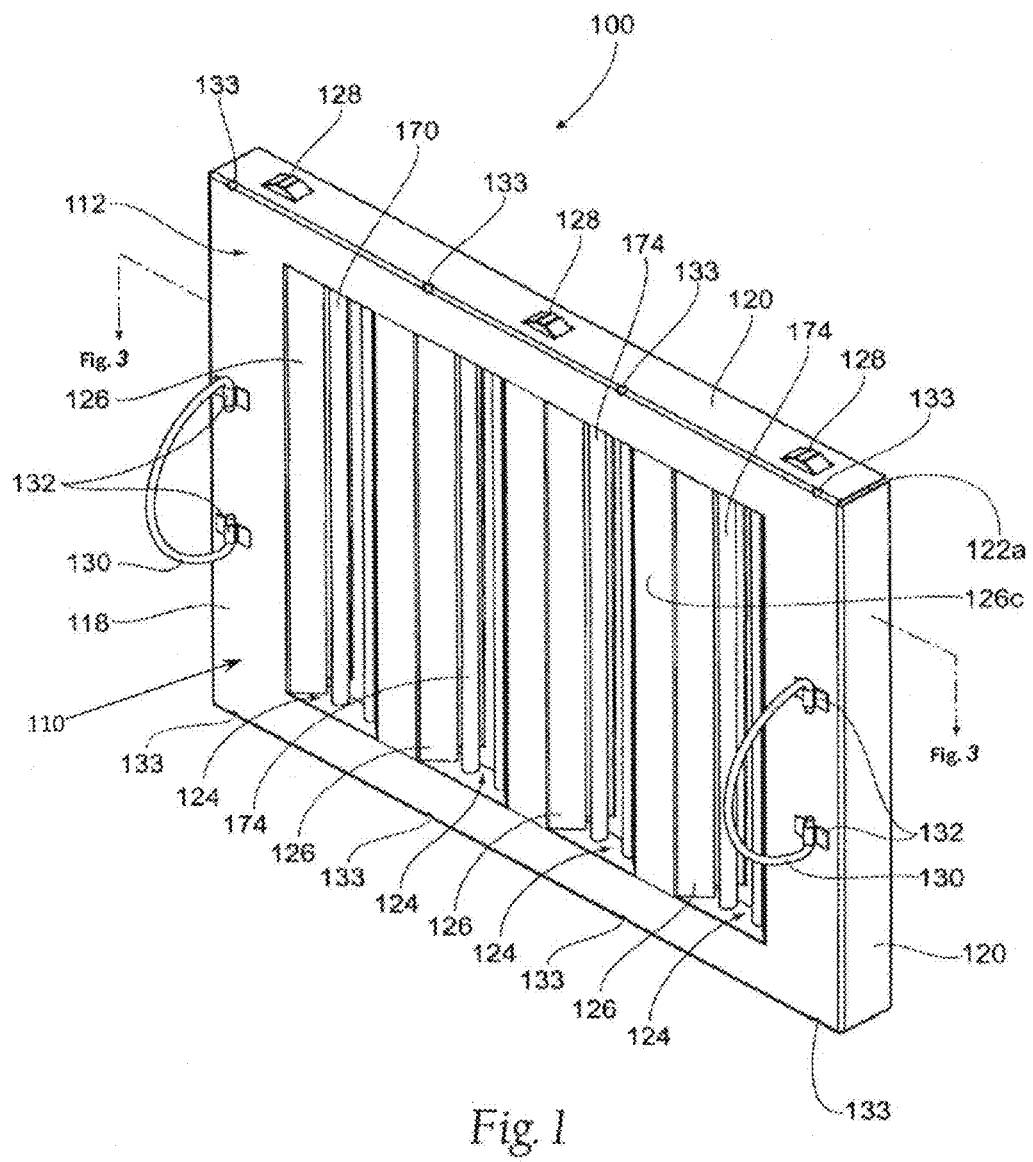
FIG. 1 is a perspective view of a filter unit according to one embodiment of the present invention.

To assist in the understanding of one embodiment of the present invention the following list of components and associated numbering found in the drawings is provided herein:

| # | Component |
|---|---|
| 100 | Filter unit |
| 110 | Housing |
| 112 | Base |
| 114 | Cover |
| 118 | Base wall |
| 120 | Lateral sidewall |
| 122 | Gap |
| 123 | Base cavity |
| 124 | Opening |
| 124a | Upstream side |
| 124b | Downstream side |
| 126 | Fin |
| 127 | Fin plate |
| 128 | Retainer or tab |
| 130 | Handle |
| 132 | Handle bracket |
| 133 | Drain hole |
| 134 | Plate |
| 136 | Lateral side member |
| 138 | Baffle |
| 140 | Opening |
| 150 | Airflow path |
| 170 | Heat exchanger |

-continued

| # | Component |
|---|---|
| 172 | Header pipe |
| 174 | Fluid flow conduit |
| 176 | Fluid flow chamber |
| 178 | Fluid port |
| 179 | Threads |
| 180 | Vibration pad |
| 200 | Exhaust housing |
| 202 | Cooking surface |
| 203 | Grease trap |
| 204 | Angle |
| 205 | Coupler |
| 210 | Supply tank |
| 212 | Conduit |
| 214 | Storage tank |
| 216 | Water heating tank |
| 218 | Pump |
| 220 | Check valve |
| 222 | Shut-off valve |
| 310 | Pump |
| 312 | Radiator |
| 314 | Heat exchanger |
| 316 | Roof |
| 318 | Heat exchanger |
| 320 | Walkway |
| 400 | Filter unit |
| 401 | Fin |
| 403 | Fastener |
| 404 | Flange |
| 405 | Hose |
| 407 | Pressure relief valve |
| 408 | Heat exchanger fin |
| 412 | Base |
| 414 | Cover |
| 418 | Base wall |
| 420 | Lateral side member |
| 423 | Cavity |
| 424 | Opening |
| 424 | Entrance opening |
| 426 | Fin |
| 433 | Drain hole |
| 438 | Baffle |
| 440 | Opening |
| 441 | Fin |
| 450 | Fluid flow path |
| 470 | Heat exchanger |
| 474 | Fluid flow conduit |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-3 and 5 depict a filter unit 100 according to one embodiment of the present invention that comprises a housing 110 and a heat exchanger 170. The housing 110, which may be comprised of one or more components, generally surrounds the heat exchanger 170. For example, the housing 110 may comprise a base 112 and a cover 114. The base 112 includes a base wall 118 and a plurality of lateral sidewalls 120. The base 112 may be stamped or otherwise formed of a planar sheet material, such as a stainless steel sheet of a desired thickness. Once stamped, the lateral sidewalls 120 may be bent towards each other, thus forming a cavity 123. Alternatively, the sidewalls 120 may be coupled to the base wall 118, such as by welding. There may be a gap 122 (see FIG. 5) between adjacent sidewalls 120, or the gap 122 may be closed with a sealant or weld. Alternatively, the plurality of sidewalls 120 may be formed as a unitary member, such as in a ring formation, and coupled to a base wall 118. Various shapes of the base, wall 118 are contemplated, although a generally planar, rectilinear shape is shown, which will facilitate manufacture and installation. In addition, such shape is easily adaptable to be utilized with filter assembly units or exhaust hoods that are presently provided in commercial cooking settings. Furthermore, it is the shape of the filter unit 100 may be at least laterally symmetrical, such that the unit may be inserted into a hood or exhaust assembly in a plurality of orientations, to provide ease of connectivity. Indeed, the filter unit may be rotationally symmetrical in at least one plane.

Figure 3:
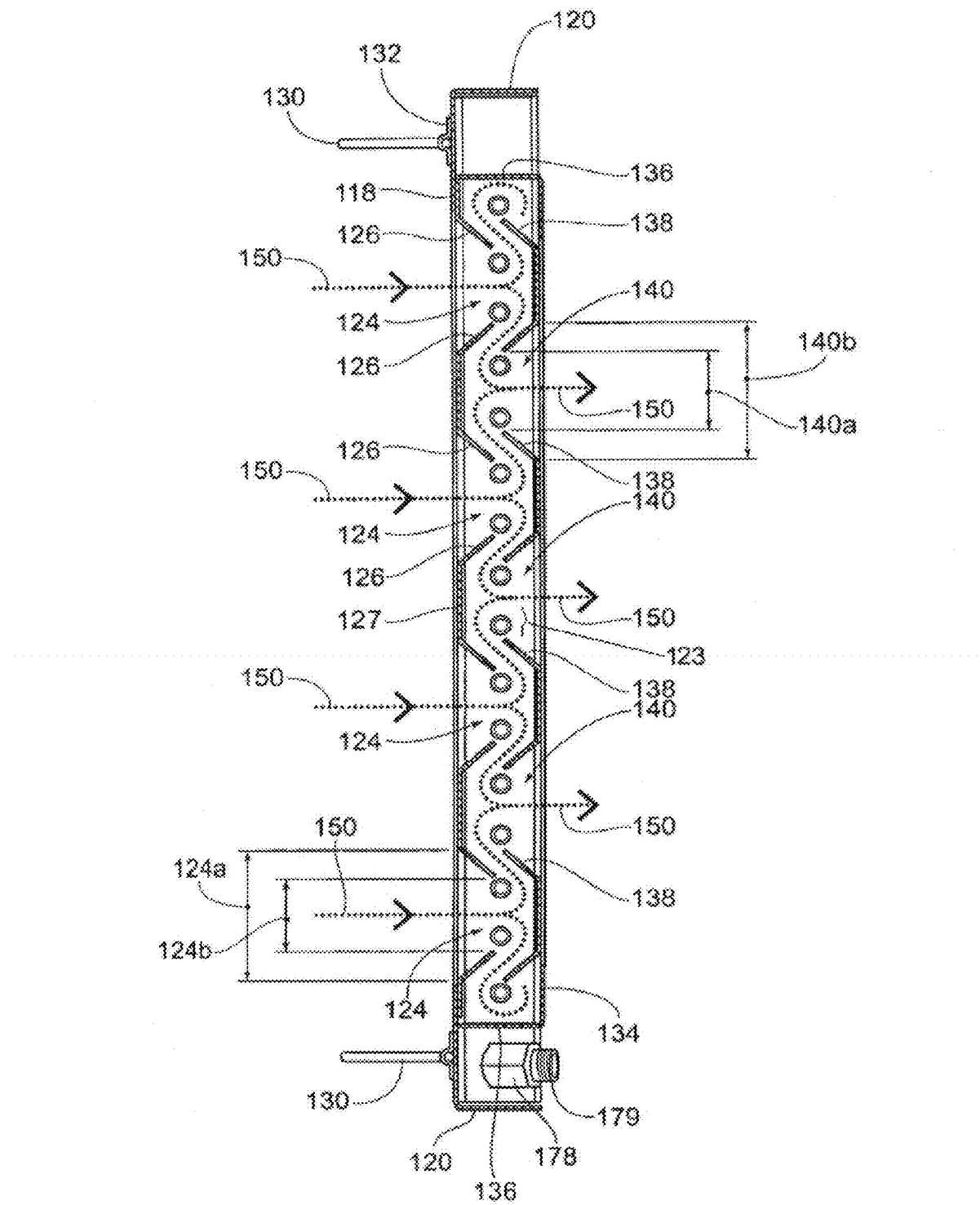
FIG. 3 is a cross-sectional view of FIG. 1.
Figure 4:
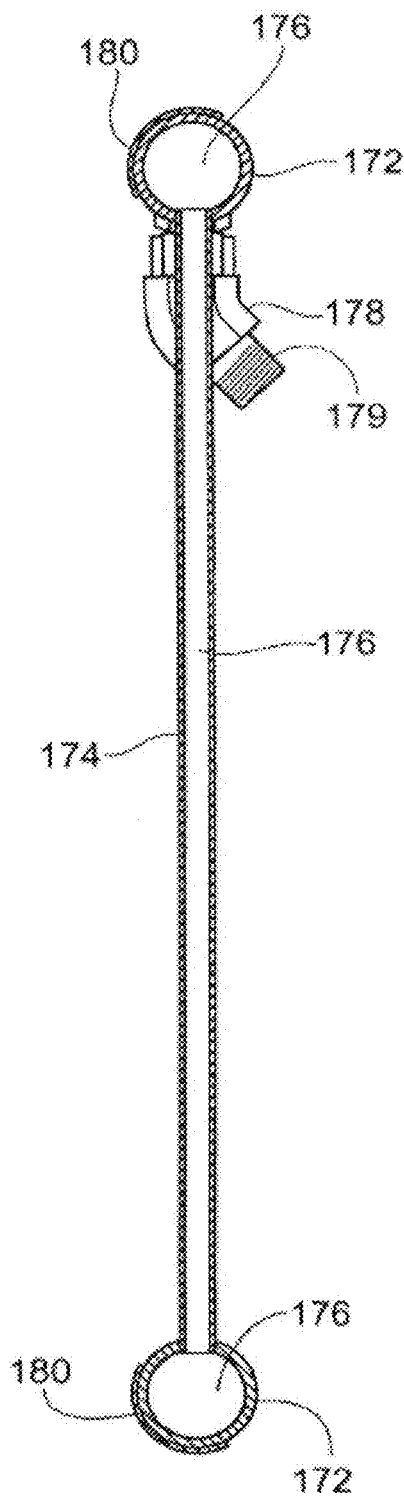
FIG. 4 is a cross-sectional view of FIG. 2 showing a heat exchanger employed by the embodiment of FIG. 1.
Figure 5:
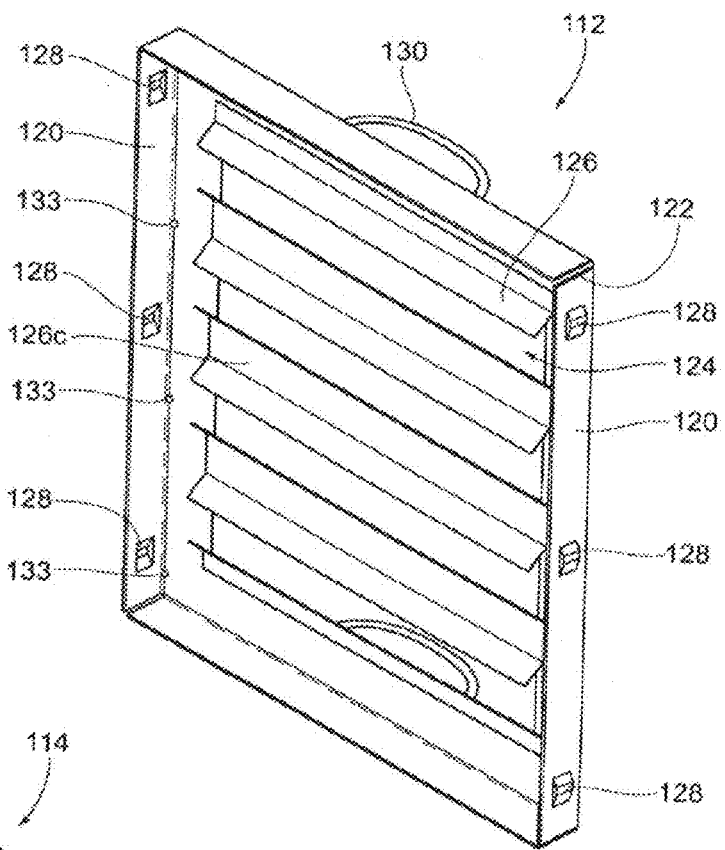
FIG. 5 is a perspective view of a base portion of a filter housing employed by the embodiment of FIG. 1.

The base wall 118 is of one embodiment is perforate, including one or more air portals 124 that allow air to pass into the base cavity 123. The openings 124 may be associated with fins 126 adapted to decrease the opening 124 size towards the cavity 113. A pair of fins 126 may be provided for each opening 124, wherein each fin 126 extends into the cavity 123. This configuration acts as a nozzle, wherein each opening is wider at its upstream side 124a and narrower at its downstream side 124b. The fins 126 may be formed from the same material as the base wall 118, and may be stamped and formed from the same piece of material as the base wall 118, and then bent into the cavity 123. Alternatively, the fins 126 may be provided as separate components that are stationarily coupled with respect to the base wall 118. If provided as separate components, two fins 126 may be provided as coupled together, perhaps as a unitary member including a fin plate 127 disposed between the two fins 126. The fin plate 127 may include a substantially planar surface extending along a length, proximate end portions of which are secured to the base wall 118. The nozzling function provided by the arranged fins 126 focuses the airflow towards a baffle 138 included on the cover 114 or disposed on the opposite side of the heat exchanger 170 from the fins 126. This configuration therefore assists in the collection of grease particles. In addition, the airflow path creates turbulence that increases exposure time of the air with the heat exchanger 170. Accordingly, one embodiment of the present invention allows no direct airflow path through the filter assembly 110, or a majority of the airflow therethrough is not direct. Indeed, as shown in FIG. 3, the fins and baffles reverse airflow to a path oriented about 45-180° from the direction of flow at the upstream side of the filter unit. One or more tortuous airflow paths 150 are created, thereby creating turbulent flow that exposes the heat exchanger 170 to heated air for a sufficient amount of time to allow for adequate heat exchange to a fluid flowing through the heat exchanger 170.

One or more retainer tabs 128 are formed on at least one of the lateral side members 120 of the base 112. The retainer tabs 128 may be on two opposing lateral side members 120. A retainer tab 128 is extruded from the lateral side number 120 so as to provide a resiliently deflectable retaining member. Also provided on the base 112 is at least one handle 130, which may be formed in a variety of ways. The handles 130 are provided in opposing positions on the filter unit 100 to allow for balanced insertion and removal of the filter unit 100 from an exhaust system. The handles 130 are full or partially wire loop handles that are suspended from handle brackets 132 that may be formed integrally with or coupled to the base wall 118.

The filter unit 100 according to some embodiments of the present invention serves as an air filter that assists in the collection of grease particles, which is especially advantageous to be used over commercial cooking surfaces. To aid in the drainage of collective grease particles, the base 112 may be provided with one or more drain holes 133. A plurality of drain holes 133 may be employed which may be formed along the juncture of one or more lateral side members 120 and the base wall 118.

Figure 2:
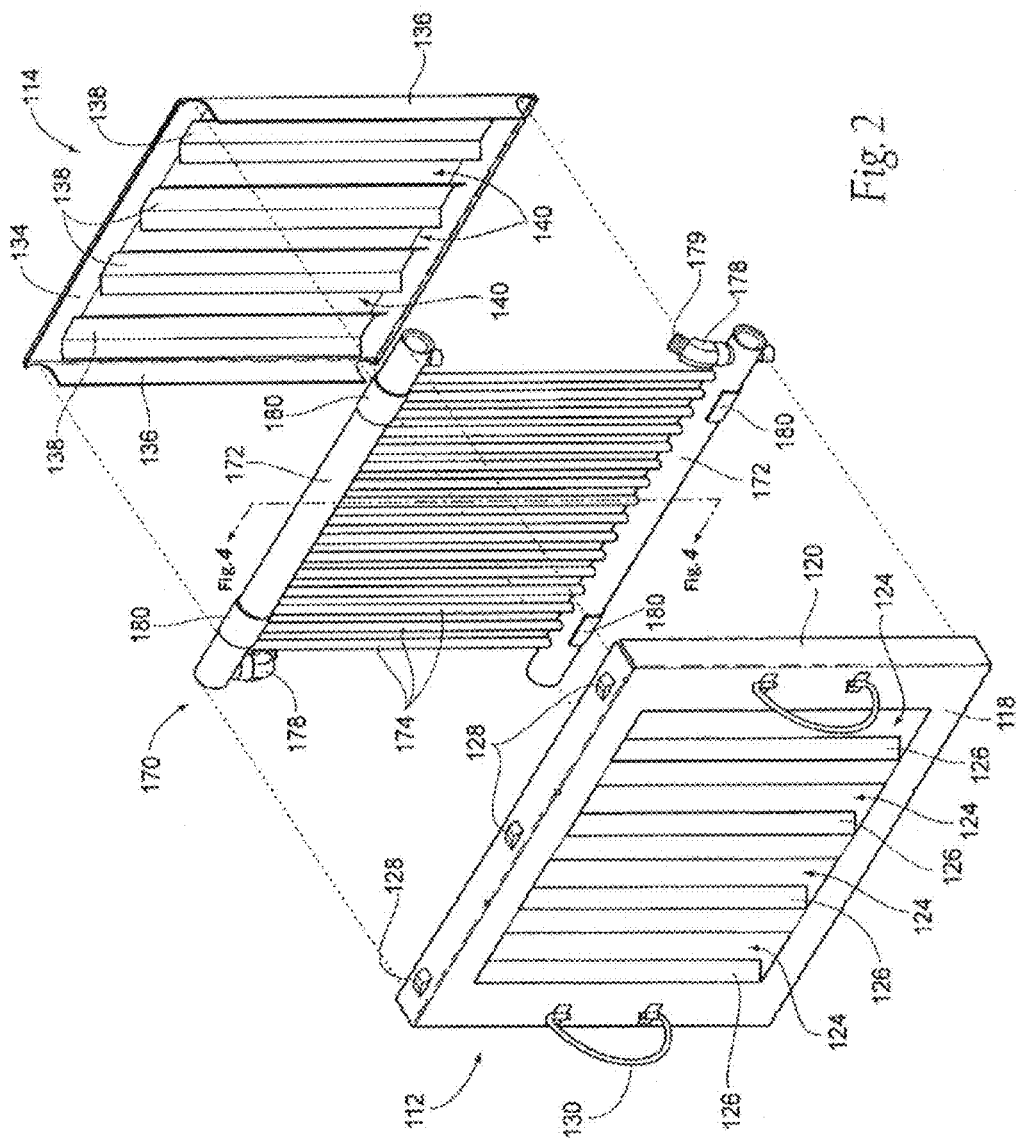
FIG. 2 is an exploded view of FIG. 1.
Figure 6:
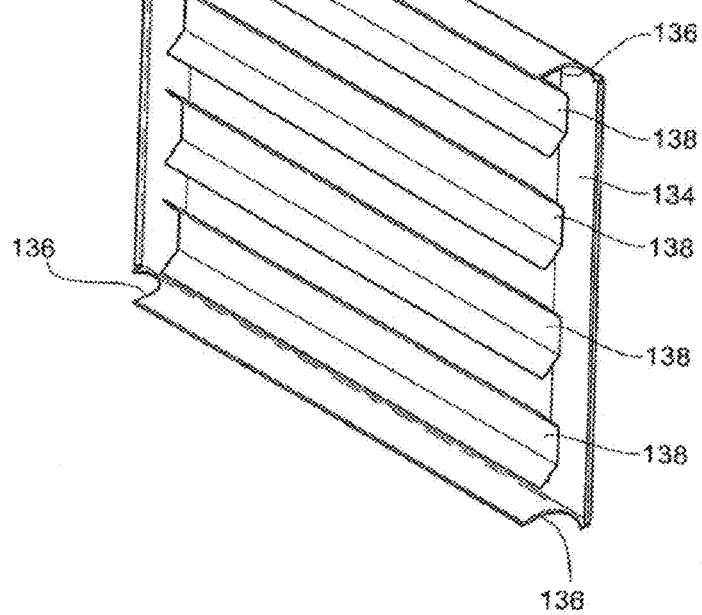
FIG. 6 is a perspective view of a cover portion of a filter housing employed by the embodiment of FIG. 1.

Referring now to FIGS. 2, 3, and 6, the cover 114 comprises a plate 134, and may further include one or more lateral side members 136 extending from the plate 134. The side members 136 are inserted between header pipes 172 of the heat exchanger 170. Furthermore, the side members 136 may be formed with one or more heat exchanger interfaces which may contact and/or surround a portion of the heat exchanger 170 to maintain position during and after installation. The cover 114 may be formed as a symmetrical shape that may be inserted into the base 112 in a plurality of orientations.

One or more baffles 138 are formed integrally with or coupled to the plate 134. The baffles 138 are disposed opposite the entrance openings 126 formed in the base 112. The cover 114 also includes at least one opening 140 similar to that provided by the base. The baffles 138 act as a one or more diffusers, such that upstream side 140a of the openings 140 disposed between the baffles 138 is smaller than the downstream side 140b. The baffles 138 may be formed similar or identical to the unitary fin members, discussed above. A flow construction created by the baffles 138 restrict and redirect flow laterally to create the tortuous airflow path 150 that aids in the collection of grease and maximizes heat transfer to the heat exchanger 170.

The filter base 112 and cover 114 are formed of stainless steel, though other materials are contemplated, such as aluminum, copper, steel, and other materials adapted to transfer heat. A plastic housing could also be used. However, plastic has demonstrated affections for grease, which may be caused by its insulative properties, and therefore it may require more frequent cleaning.

The heat exchanger 170 is formed from two header pipes 172, which may be provided in a parallel arrangement, and a plurality of fluid flow conduits 174, which also may be provided in a parallel arrangement, extending between the two header pipes 172. The heat exchanger 170 is sized to be positioned substantially within the cavity 123. A fluid flow chamber 176 is provided within the header pipes 172 and conduits 174. A fluid may be a potable fluid, such as water, or propylene glycol. While the heat exchanger 170 could be formed asymmetrically, it is at least rotationally symmetrical in at least one plane, such that it may be inserted into the cavity 123 in a plurality of orientations. In one embodiment, each header 172 is provided with a fluid port 178 in fluid communication with the fluid flow chamber 176. The ports 178 may be provided with threads 179 or other coupling mechanisms, such as a fluid quick connect coupling that interfaces to a fluid supply or drain. In one embodiment of the present invention, the ports 178 are provided on opposite ends of their respective header 172. Vibration pads 180 may be provided on one or more components of the filter unit 100. A plurality of pads 180 may be adhered to each header pipe 172 in the heat exchanger 170. The vibration pads 180 cooperate with the base wall 118 to prevent a rattling of two or more components.

A material for one or more components of the heat exchanger is copper, which may be coated with a non-stick material, such as a paint including polytetrafluoroethylene, available as a Teflon® material, available from E.I. du Pont de Nemours and Company of Wilmington, Del. The non-stick material may be painted onto the desired heat exchanger components. Another acceptable material for the heat exchanger headers 172 and conduits 174 is steel tube, which may also be painted with a non-stick material.

Figure 7:
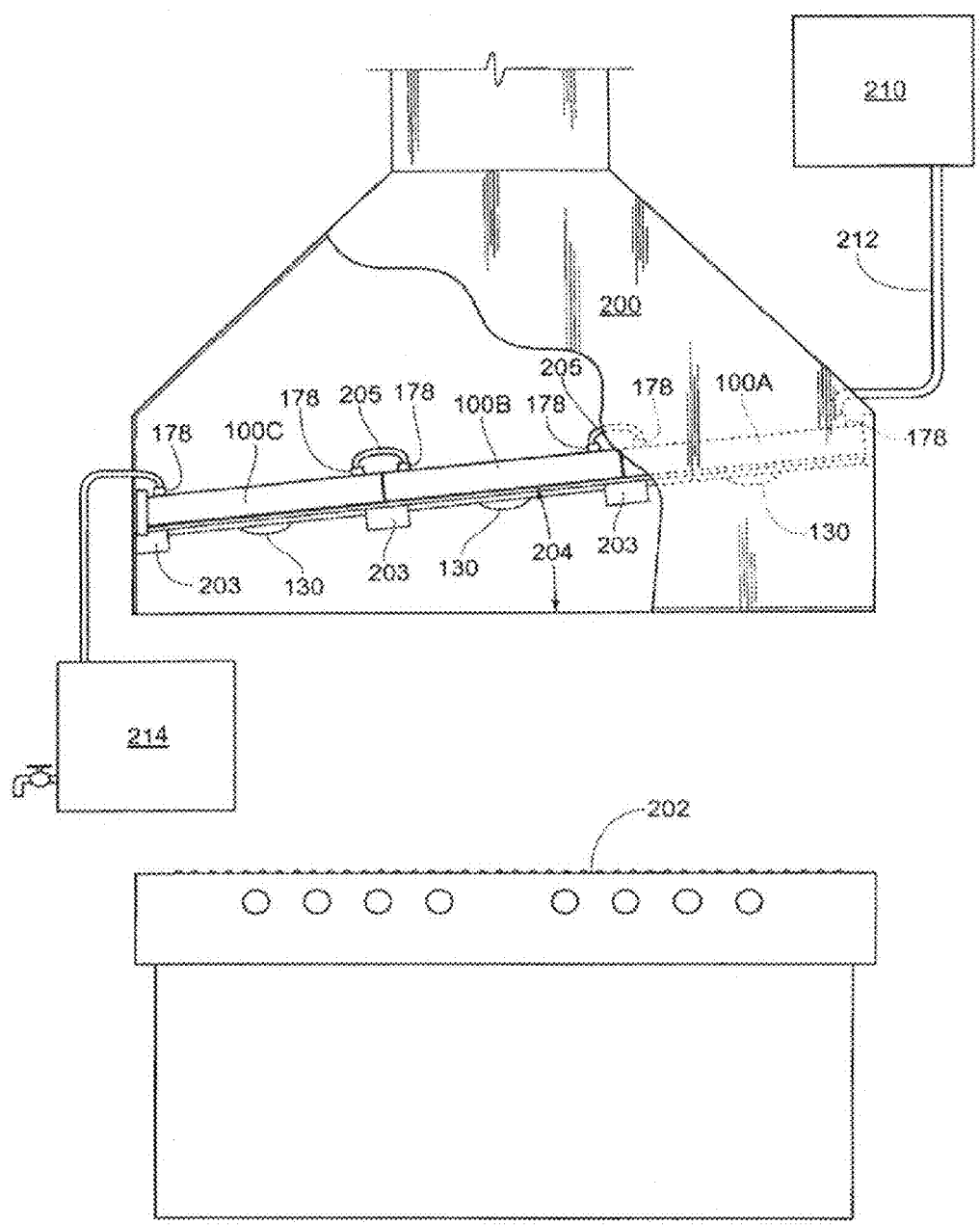
FIG. 7 is a partial cutaway view of a venting and filtering system of one embodiment of the present invention.

Generally, systems and methods according to some embodiments of the present invention collects heat generated by a cooking surface, which would otherwise be wasted as exhaust, and transfer such heat to other locations for use in an open or closed circulation system. As shown in FIG. 7, one or more filter units 100 may be installed in an exhaust housing 200 above a cooking surface 202. While the filter 100 could be installed at any desirable angle, such as horizontal, some embodiments include a filter 100 installed at an angle 204 relative to horizontal level. The angle 204 may be between about 12 degrees to about 45 degrees to allow collected particles to drain. In this configuration, the longitudinal dimension of the fins and baffles are disposed at approximately the same angle. Thus, collected particles will drain from the drain holes and into one or more grease traps 203. As further shown in FIG. 7, a plurality of filter units 100 may be coupled together to form an expanded filter unit. The units 100 may be coupled in series, as shown, or in parallel. If coupled in series, a coupler 205 may be connected at one end to a port 178 of one filter unit 100A and at the other end to a supply port 178 of a subsequent filter unit 100B.

FIG. 7 depicts an open system. Here, the heated fluid flowing through the heat exchangers is removed and put to some other use, such as dishwashing, or it is stored for future use. Water or other desirable fluid may be provided by gravity feed, such as from an elevated supply tank 210 or municipal water supply, or it may be pumped to the system. Conduit 212 and standard connections may couple the water supply to a first filter unit 100A. The fluid flows through one or more filter units 100, and then drain into a storage tank 214 for future use, such as by a dishwasher, hot water supply in a restroom, or for other purposes.

Figure 8:
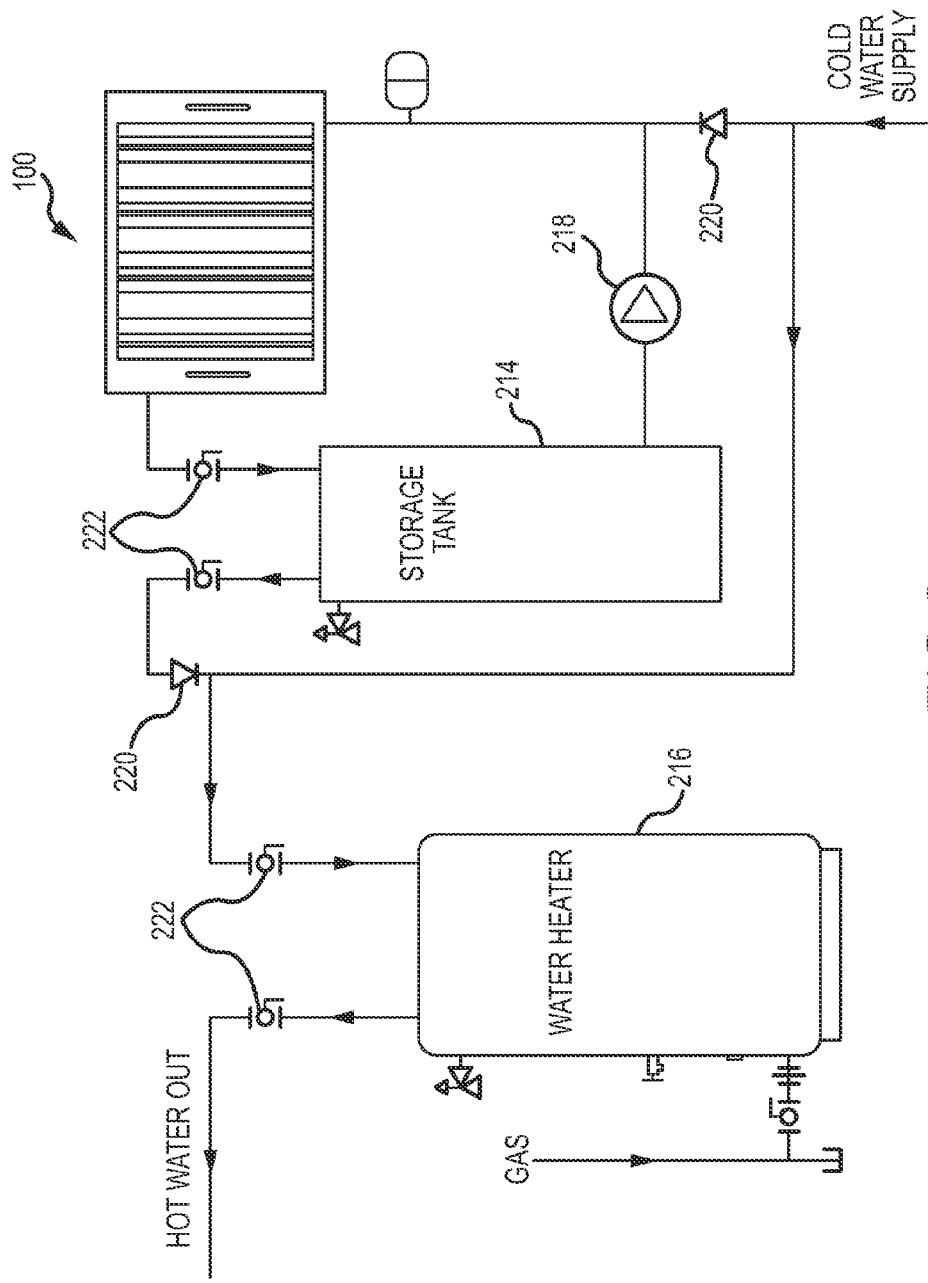
FIG. 8 is a schematic of another embodiment of a venting and filtering system.

Another example of an open system is shown in FIG. 8. Here, in addition to the storage tank 214, this system includes a water heating tank 216 and a recirculating pump 218. The associated plumbing includes various check valves 220 and shut-off valves 222. One advantage to this enhanced system is that if fluid usage exceeds the supply of heated fluid, fluid stored in the storage tank 214 may be recirculated to keep the water in the plumbing system warm. The recirculating pump 218 may be selectively activated and deactivated with a timer or as a function of a measured temperature of the fluid in the storage tank 214.

Figure 9:
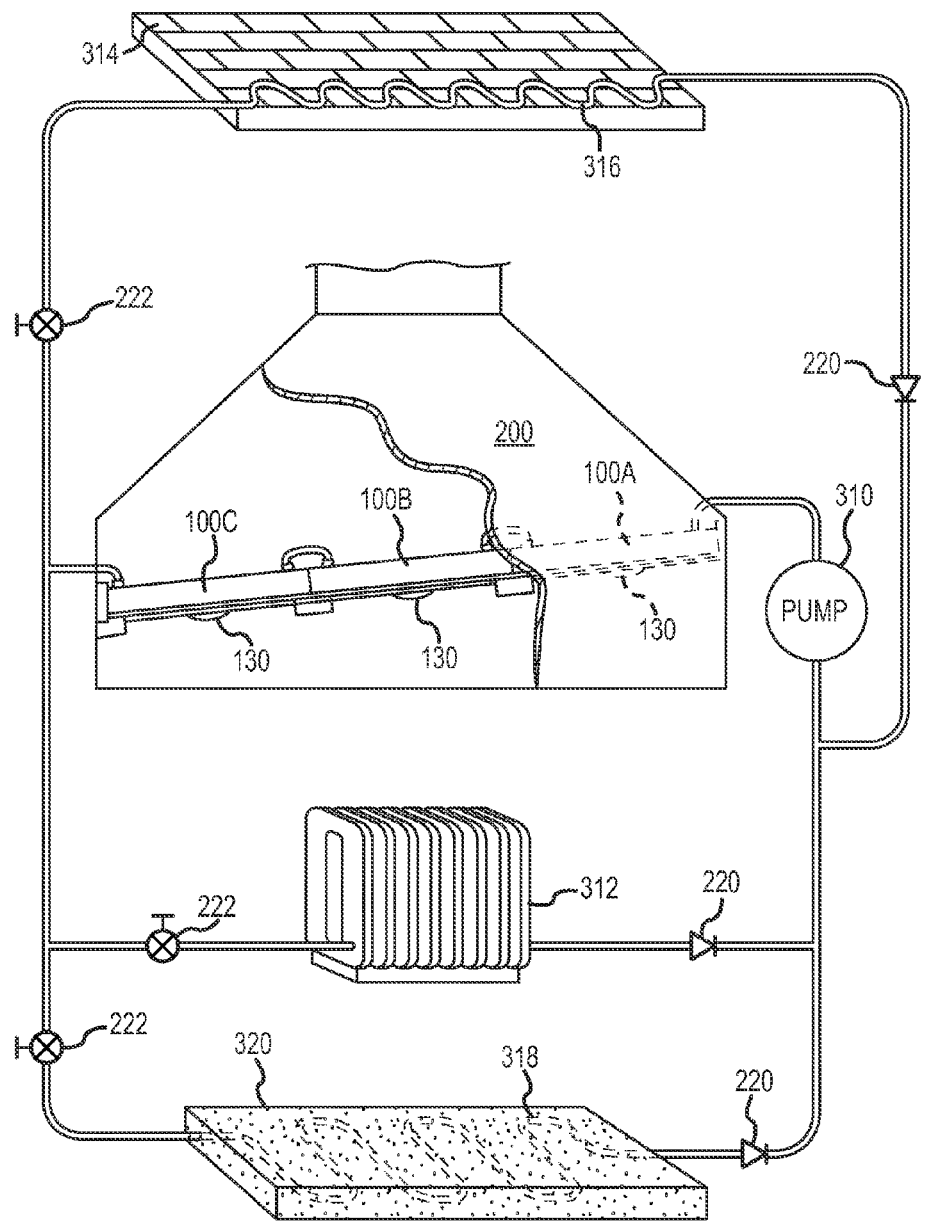
FIG. 9 is a partial cutaway view of another embodiment of a closed venting and filtering system.
Figure 10:
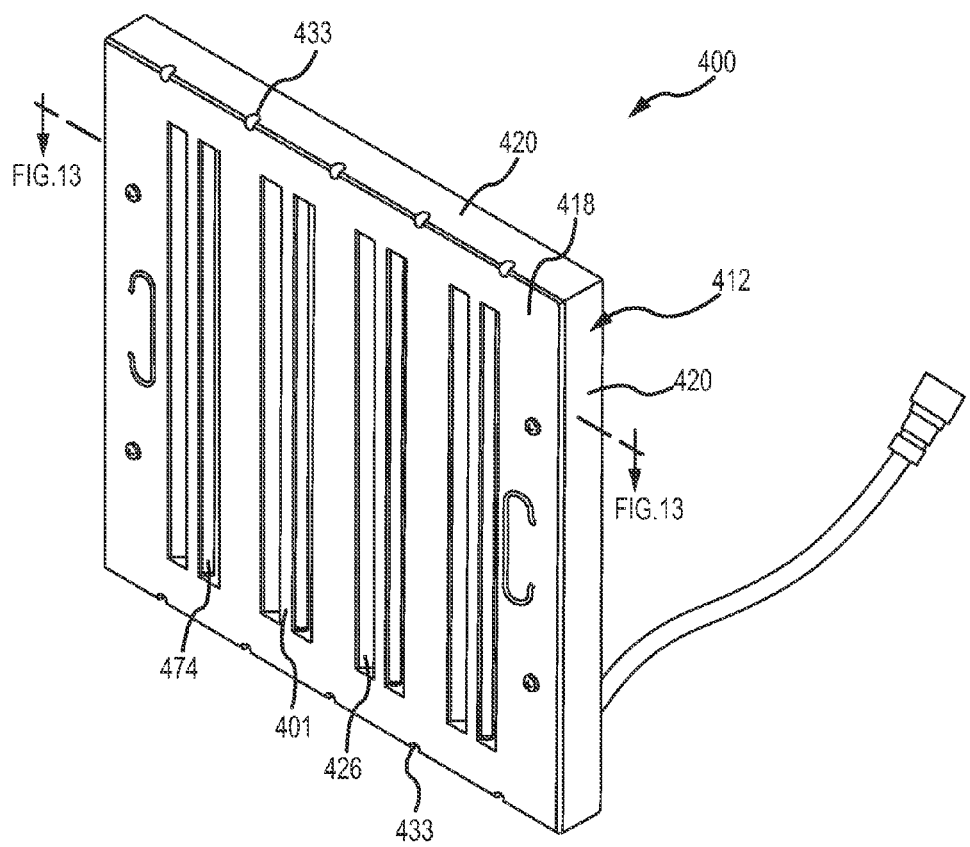
FIG. 10 is a front perspective view of a filter unit according to another embodiment of the present invention.

FIG. 9 shows a closed system, that uses heat from the exhaust gases elsewhere. In this system, water or other fluid is introduced and substantially all of any residual air is purged. The fluid may be pumped through the system by an inline pump 310, through conduit 212 and through one or more filter units 100. After traveling through the one or more filter units 100, in which the fluid is heated by exhaust from the cooking surface 202, the fluid travels through one or more additional heat exchangers. For instance, the fluid may be pumped to a radiator 312 to heat a room. Additionally or alternatively, the fluid may be pumped through a roof heat exchanger 314 disposed along the edge of the roof 316 of the building to prevent ice damming. The fluid may be pumped through a sidewalk heat exchanger 318 disposed beneath or embedded in a concrete or other external walkway 320 to reduce the buildup of ice thereon. It is to be appreciated that the function of a system according to some embodiments of the present invention may be changed depending upon the time of year. For instance, in summer months, it may not be desirable to use a closed system for heating as described above. In such situations, the fluid may remain static and the filter units 100 may be used to collect particulates from the exhaust air. Alternatively, the closed system could be changed to an open system in the summer months, thereby providing hot water for use. Those of skill in the art will appreciate that the heat energy can be converted to electrical or mechanical energy using common methods.

FIGS. 10-13 show a filter unit 400 of another embodiment of the present invention. Similar to the embodiments described above, filter unit 400 includes a base 412 interconnected to a cover 414. The cover 414 and a base wall 418 of the base 412 define a cavity 423 that surrounds the heat exchanger 470 that receives the airflow 450. As in the embodiments described above, the base 412 includes a plurality of fins 426 that direct airflow into the cavity 423. Here, however, the openings 424 are bounded by the fins 426 and a fin 401 that is generally parallel to the base wall 418. The fin 401 directs gas towards the angled fins 426 and define a circuitous flow path 450, which is described in further detail below.

Similarly, the cover 414 includes a plurality of baffles 438 that are angled into the cavity 423. Again, the baffles 438 define an exit opening 440. A fin 441 is positioned between adjacent baffles 438 and helps shield the fluid conduits 474 of the heat exchangers 470. Accordingly, a fluid flow path 450 is provided that redirects or at least partially reverses fluid flow. As gas enters the entrance opening 424, it is directed by the fin 401 and the fins 426 into contact with a baffle 438. These features redirect fluid flow between about 45-180° from its original path, which increases contact with fluid conduits 474. The base wall 418 and fin 426 of an adjacent entrance opening 424 will then direct the redirected airflow so it will exit the space between the baffle 438 and the fin 441. In this fashion, the hot air exposure to the fluid conduits 474 is dramatically increased without unduly slowing fluid flow.

Figure 12:
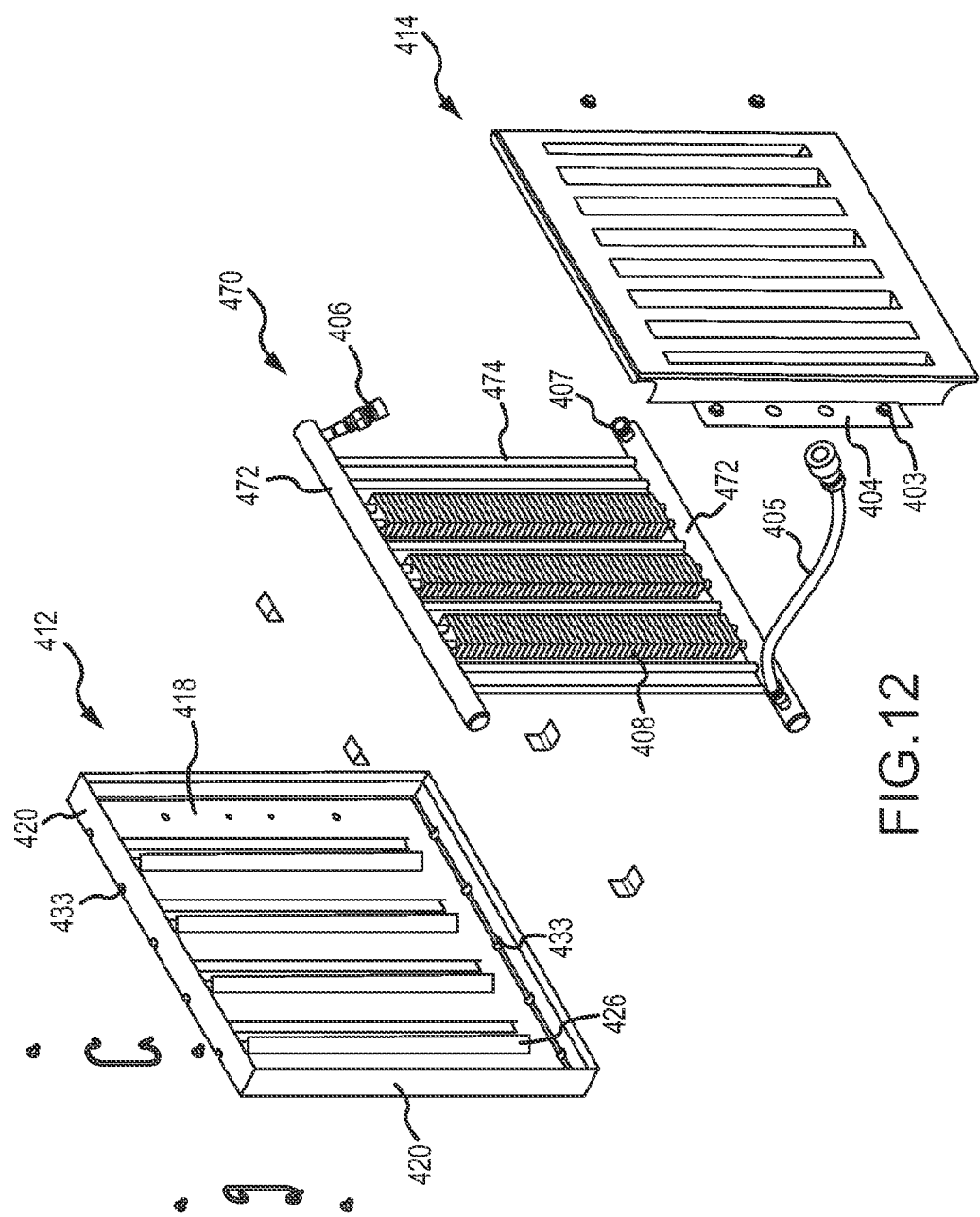
FIG. 12 is a exploded view of FIG. 10.
Figure 13:
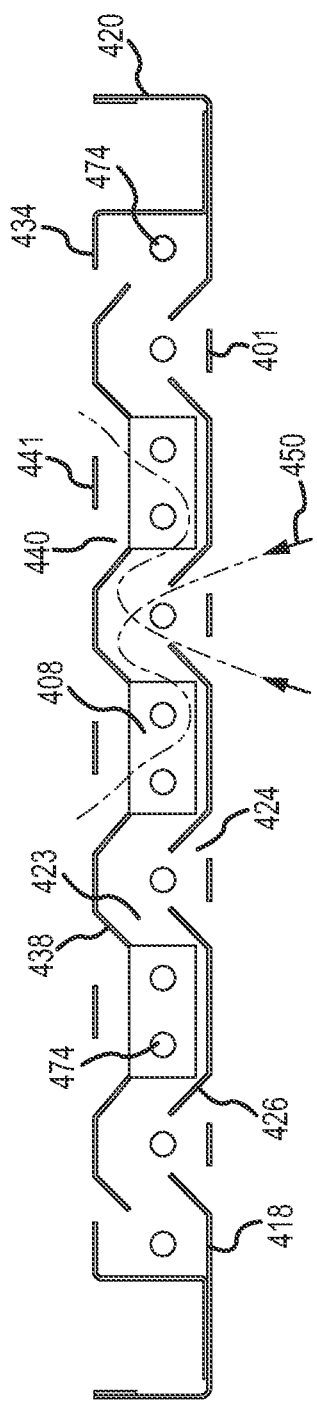
FIG. 13 is a cross-sectional view of FIG. 10.

As shown in FIG. 12, the fluid flow conduits 474 may include a plurality of heat exchanger fins 408. The fins 408 may extend the entire length of the fluid flow conduits 474 or portion thereof. Further, the fins may encapsulate one or more fluid flow conduits 474. Some of the fluid flow conduits 474 do not include exchanger fins 408. The exchanger fins 408 increase the amount of surface area that contact the hot gas.

FIG. 12 also shows that the cover for 12 may be interconnected to the base for 12 by way of a plurality of fasteners 403 in incorporated onto a flange 404.

Figure 11:
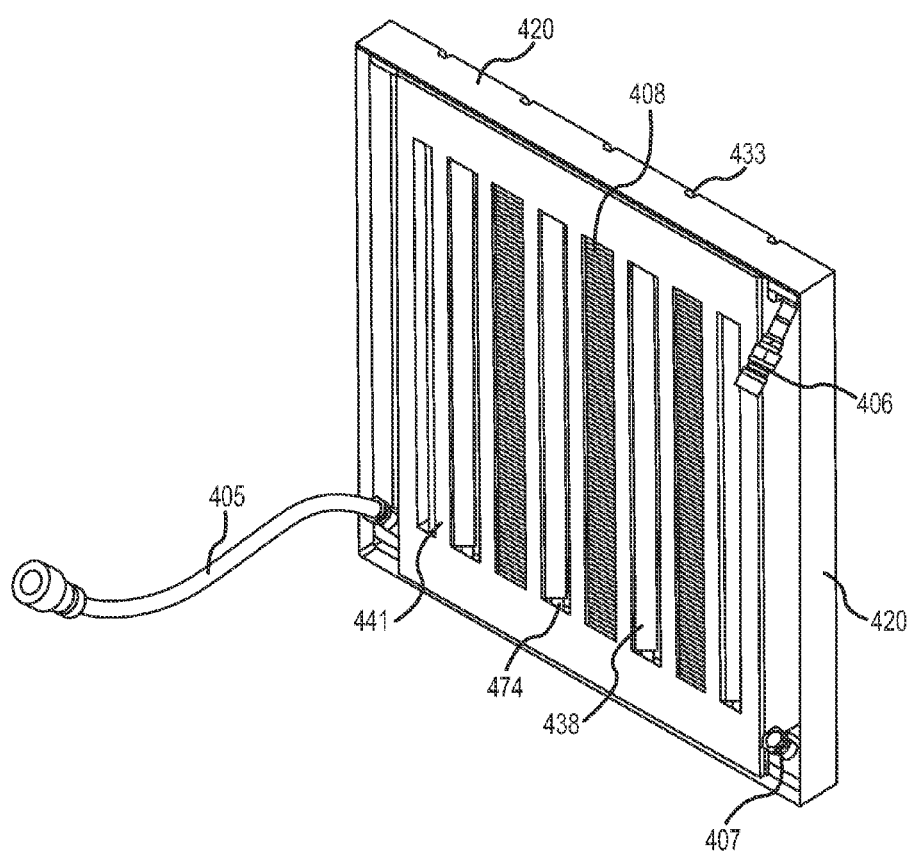
FIG. 11 is a rear perspective view of FIG. 10.

FIG. 11 also shows a pressure relief valve that opens when high-pressure is encountered within the system which is a safety feature.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A filter unit comprising:
   a housing including a cavity;
   a heat exchanger disposed substantially within said cavity;
   an entrance opening provided through said housing on an upstream side of said heat exchanger;
   a first angled fin associated with a first lateral edge of said entrance opening;
   a second angled fin spaced from said first angled fin, said second angled fin associated with a second lateral edge of said entrance opening;
   a third fin positioned between said first angled fin and said second angled fin;
   an exit opening provided through said housing on a downstream side of said heat exchanger, said downstream side being oppositely disposed of said upstream side;
   a first angled baffle associated with a first lateral edge of said exit opening; and a second angled baffle spaced from said first angled baffle, said second angled baffle associated with a second lateral edge of said exit opening.

2. The filter unit of claim 1, further comprising a third baffle positioned between said first angled baffle and said second angled baffle.

3. The filter unit of claim 1, wherein said heat exchanger is comprised of a plurality of fluid conduits, wherein at least one of said plurality of fluid flow conduits include at least one fin.

4. The filter unit of claim 1, wherein said housing comprises a base and a cover.

5. The filter unit of claim 4, wherein said base comprises a substantially planar base wall having a base wall perimeter; and a plurality of lateral sidewalls coupled to said base wall perimeter substantially encircling said base cavity, wherein said entrance opening is formed through said base wall.

6. The filter unit of claim 5, wherein said first fin and said second fin extend at least partially across said entrance opening and into said cavity at an oblique angle relative to said base wall, and said third fin is parallel to said base wall.

7. The filter unit of claim 5, wherein said exit opening is provided in a wall of said cover that is generally parallel to said base wall, and wherein said first baffle and said second baffle extend at least partially across said exit opening and into said cavity at an oblique angle relative to said wall, and said third baffle is parallel to said wall.

8. The filter unit of claim 1, wherein said heat exchanger comprises:
a first header;
a second header pipe spaced from said first header pipe;
at least one fluid flow conduit disposed between and in fluid communication with said first header pipe and said second header pipe;
a first fluid port provided on said first header pipe; and
a second fluid port provided on said second header pipe.

9. The filter unit of claim 8, wherein said at least one fluid flow conduit comprises spaced fluid flow conduits that are disposed substantially perpendicular to said first header pipe and said second header pipe.

10. The filter unit of claim 9, wherein at least one pair of adjacent fluid flow conduits are interconnected with a plurality of heat exchange fins.

11. The filter unit of claim 9, wherein a third and a fourth fluid flow conduits, a sixth and a seventh fluid flow conduits, and a ninth and tenth fluid flow conduits comprise conduit pairs that are interconnected with a plurality of heat exchange fins.

12. The filter unit of claim 8, further comprising a pressure relief valve interconnected to said second header pipe.

13. A system comprising:
a cooking surface including a heat source;
an exhaust system adapted to draw in gasses that are disposed above said cooking surface, said exhaust system providing a gas flow path for the gasses;
a filter unit disposed in said gas flow path, said filter unit comprising:
a housing including a cavity;
a first heat exchanger disposed substantially within said cavity, said first heat exchanger including a fluid input port and a fluid output port;
at least one entrance opening provided through said housing on an upstream side of said first heat exchanger;
a first angled fin associated with a first lateral edge of said at least one entrance opening;
a second angled fin spaced from said first angled fin, said second angled fin associated with a second lateral edge of said at least one entrance opening;
at least one exit opening provided through said housing on a downstream side of said first heat exchanger, said downstream side being oppositely disposed of said upstream side;
a first angled baffle associated with a first lateral edge of said at least one exit opening;
a second angled baffle spaced from said first angled baffle, said second angled baffle associated with a second lateral edge of said at least one exit opening;
wherein said first and second angled baffles are aligned with said at least one entrance opening, such that when the gasses are drawn through said at least one entrance opening and across said first heat exchanger, said first and second baffles redirect the gasses towards the first heat exchanger before the gasses can exit said housing through the at least one exit opening;
a fluid supply coupled to said input port;
a drain line coupled to said output port and to at least one of a storage tank and a second heat exchanger.

14. The system of claim 13, further comprising a third fin positioned between said first angled fin and said second angled fin.

15. The system of claim 13, further comprising a third baffle positioned between said first angled baffle and said second angled baffle.

16. The filter unit of claim 13, wherein said first heat exchanger is comprised of a plurality of fluid conduits, wherein at least one of said plurality of fluid flow conduits include at least one fin.

17. The system of claim 13, wherein said second heat exchanger is at least one of a radiator adapted to heat an indoor space, a length of heat-conductive tubing disposed in or below a walking surface, and a length of heat-conductive tubing disposed on a roof of a building.

18. The system of claim 13, wherein said first heat exchanger is angled relative to said cooking surface.

19. The system of claim 18, wherein the angle between said cooking surface and said first heat exchanger is from about 10 degrees to about 60 degrees.

* * * * *